(12) United States Patent
Thacker et al.

(10) Patent No.: US 7,028,258 B1
(45) Date of Patent: Apr. 11, 2006

(54) DYNAMIC PAGINATION OF TEXT AND RESIZING OF IMAGE TO FIT IN A DOCUMENT

(75) Inventors: Charles P. Thacker, Palo Alto, CA (US); Ralph Sommerer, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/410,414

(22) Filed: Oct. 1, 1999

(51) Int. Cl.
*G06F 7/00* (2006.01)

(52) U.S. Cl. ...................... 715/525; 715/517; 715/518; 715/519; 715/520; 345/660; 345/670

(58) Field of Classification Search ........ 715/517–520, 715/525, 530, 531; 345/660, 670
See application file for complete search history.

(56) References Cited

U.S. PATENT DOCUMENTS

| | | | | |
|---|---|---|---|---|
| 4,709,348 A | * | 11/1987 | Horn et al. ................. | 715/525 |
| 4,739,477 A | * | 4/1988 | Barker et al. ............... | 707/100 |
| 5,111,397 A | * | 5/1992 | Chirokas et al. ............ | 715/537 |
| 5,590,257 A | * | 12/1996 | Forcier ........................ | 715/530 |
| 5,623,679 A | * | 4/1997 | Rivette et al. .............. | 715/526 |
| 5,704,029 A | * | 12/1997 | Wright, Jr. .................. | 715/505 |
| 5,897,644 A | * | 4/1999 | Nielsen ....................... | 715/513 |
| 5,911,146 A | * | 6/1999 | Johari et al. ................ | 715/525 |
| 6,175,845 B1 | * | 1/2001 | Smith et al. ................. | 715/525 |
| 6,185,588 B1 | * | 2/2001 | Olson-Williams et al. .. | 715/515 |
| 6,374,273 B1 | * | 4/2002 | Webster ...................... | 715/513 |
| 6,456,305 B1 | * | 9/2002 | Qureshi et al. ............. | 345/800 |
| 6,487,567 B1 | * | 11/2002 | Michelman et al. ........ | 715/525 |
| 6,547,830 B1 | * | 4/2003 | Mercer ........................ | 715/518 |
| 6,553,412 B1 | * | 4/2003 | Kloba et al. ................ | 709/219 |

OTHER PUBLICATIONS

Wordperfect 6.1 wordprocessing application wrap text feature printout, Corel, p. 1, 1996.*
Achugbue, J., "On the Line Breaking Problem in the Text Formatting", ACM Sigplan Notices, Proc. of ACM SIGPLAN SIGOA symp. on Text manipulation, 1981, pp. 117-122.*

* cited by examiner

*Primary Examiner*—Cesar B Paula
(74) *Attorney, Agent, or Firm*—Amin & Turocy, LLP

(57) ABSTRACT

Dynamic pagination for electronic documents, such as electronic books, is disclosed. In one embodiment, a computer-implemented method first processes a document made up of at least text, as a number of segments. Second, the method determines a number of page breaks within a predetermined segment. This segment, for example, may be entered into the memory of a viewing device, such as an electronic book device. Third, the method renders a predetermined page within the predetermined segment, and finally displays the predetermined page. For example, the page can be displayed on a display device such as a flat-panel display of an electronic book device.

30 Claims, 10 Drawing Sheets

DYNAMIC PAGINATION OF TEXT AND RESIZING OF IMAGE TO FIT IN A DOCUMENT

RELATED APPLICATIONS

This application is related to the coassigned, cofiled and copending application entitled "Balanced View Generation for Electronic Documents" U.S. application Ser. No. 09/410,644, U.S. Pat. No. 6,966,026, which is hereby incorporated by reference.

FIELD OF THE INVENTION

This invention relates generally to electronic documents such as electronic books, and more particularly dynamic pagination of such electronic documents.

BACKGROUND OF THE INVENTION

Documents, such as books, magazines, etc., are increasingly being distributed in an electronic manner. For example, books distributed electronically are commonly referred to as electronic books. The terminology electronic document is used herein to refer to any type of document that is stored and/or distributed in an electronic manner. Such so-called electronic documents can be viewed on general-purpose desktop and laptop computers, as well as other devices, such as personal digital assistants (PDA's), palmtop computers, hand-held computers, set-top boxes for television sets, etc. Furthermore, one type of device on which electronic documents can be viewed is referred to as an electronic book device, which is a specialized device designed for the reading of electronic documents.

Especially for electronic book devices, electronic documents typically are paginated statically, specifically for a particular device. This means, however, that the electronic documents are not readily adaptable to other devices, or future devices. That is, static pagination ignores the very large installed base of desktop and laptop computers. Although liquid crystal displays (LCD's) are improving in quality and decreasing in price, they are still the most expensive component in a laptop computer currently, so a specialized reader device based on these components will remain expensive, at least for a while. Furthermore, the best LCD available currently is at best only merely adequate to display a page originally formatted for paper distribution. Thus, a distribution format that is optimized for a fixed-size display is disadvantageous, since display technologies are evolving rapidly.

For these and other reasons, there is a need for the present invention.

SUMMARY OF THE INVENTION

The invention relates to dynamic pagination for electronic documents. In one embodiment, a computer-implemented method performs four parts. First, the method processes a document made up of at least text, as a number of segments. For example, the method can assemble the document from the segments, or divide a document into segments. Second, the method determines a number of page breaks within a predetermined segment. This segment, for example, may be entered into the memory of a viewing device, such as an electronic book device. Third, the method renders a predetermined page within the predetermined segment, and finally displays the predetermined page. For example, the page can be displayed on a display device such as a flat-panel display of an electronic book device.

Embodiments of the invention provide for advantages not found in the prior art. For example, embodiments allow for quick pagination of electronic documents regardless of the host device on which they are being viewed. By having the document made up of a number of segments, which may, for example, correspond to chapters of a book, only one segment at a time has to be paginated on-the-fly. Furthermore, only the currently desired page of the segment needs to be rendered for display. The invention also provides for flexibility in different types of host devices on which the electronic documents may be viewed. By paginating pages dynamically, electronic books under embodiments of the invention can look quite good on devices ranging from palm-sized personal computers (PC's) to twenty-one inch monitors.

The invention includes electronic devices, computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

Introduction

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Overview

In this section, an overview of embodiments of the invention is provided. The overview is meant to provide a general description of at least some embodiments of the invention. In subsequent sections, more detailed embodiments of the invention are presented.

Figure 1A:
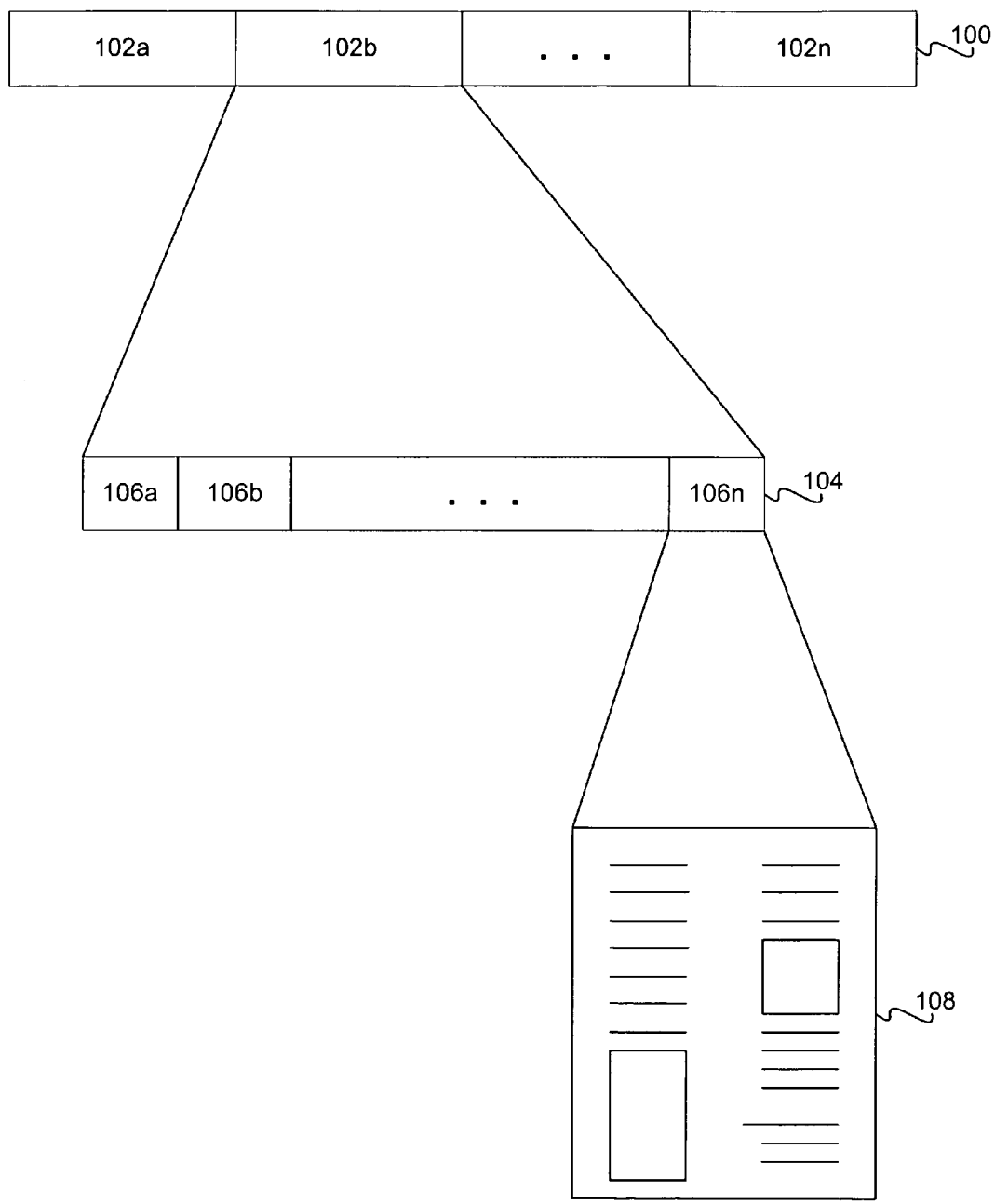
FIG. 1(a) is a diagram illustrating the manner by which a document is made up of segments, how one segment has its page breaks determined, and how one page is rendered and displayed, according to an embodiment of the invention.

Referring first to FIG. 1(a), a diagram illustrating the general manner according to which embodiments of the invention operate is shown. A document 100 has a number of segments 102a, 102b, . . . , 102n. The document 100 is an electronic document, which is an electronic version of a document that may or may not also be available as a hard copy (e.g., paper) version. For example, such documents include books, magazines, pamphlets, web pages, etc. The invention is not particularly limited to a given type of electronic document. The document 100 includes at least text, and may also include other aspects, such as images, footnotes, etc., as well.

Each segment 102a, 102b, . . . , 102n desirably corresponds to a meaningful partition of the document 100. For example, where the document 100 is an electronic book, each segment can correspond to a chapter within the book. As a further example, where the document 100 is an electronic magazine, each segment can correspond to an article within the magazine. The utility of having the document 100 partitioned into different segments is explained later in this section of the detailed description.

A predetermined segment 104 of the document 100 is paginated into pages 106a, 106b, . . . , 106n. The segment 104 may be, for example, the segment containing a page desired to be viewed by a user. When an electronic document is first opened, the segment 104 may be the first segment of the document, such that it contains the first page of the document. The invention is not limited to the manner by which the predetermined segment 104 is chosen.

The pagination of the predetermined segment 104 of the document 100 into pages 106a, 106b, . . . , 106n is referred to as dynamic pagination in that the document 100 desirably does not itself having internal page breaks denoted, which may correspond to a static definition of a page for a particular display device. Thus, the document 100 is independent of the display device on which it will be viewed, so that it can be dynamically paginated for any type of display device on which it happens to currently be viewed. In one embodiment, dynamic pagination is accomplished as described in a succeeding section of the detailed description.

In paginating the segment 104 into different pages, it is noted that embodiments of the invention do not lay out, or render, each individual page within the segment, but rather only determine where the page breaks within the segment 104 lie. Once a predetermined page 108 is selected from the segment 104, it is at that time that the page is rendered, and displayed on a display device such as a flat-panel display. The invention is also not limited to the manner by which the predetermined page 108 is chosen.

Furthermore, in one embodiment, the document 100 itself is stored on a storage device, which is desirably a non-volatile storage device such as a hard disk drive, flash memory device, PC card hard drive, read-only memory (ROM), etc. In this embodiment, only the predetermined segment 104 is entered into memory, which is typically volatile memory such as types of random-access memory (RAM). Then, only the predetermined page 108 is rendered, or laid out, also in the memory, for display on a display device such as a flat-panel display, a cathode-ray tube, etc.

By partitioning the document 100 into different segments 102a, 102b, . . . , 102n, only paginating a predetermined segment 104 into pages 106a, 106b, . . . , 106n, and only rendering a predetermined page 108 to be displayed on a display device, embodiments of the invention provide for advantages not found in the prior art. For example, where an embodiment of the invention is implemented in conjunction with an electronic book device, such a device is likely to have a limited amount of volatile memory, and a relatively slow processor. By only entering one predetermined segment 104 into memory at a given time (as opposed to the entire document 100, for example), memory is conserved. Furthermore, by only paginating one predetermined segment 104 into pages 106a, 106b, . . . , 106n (as opposed to paginating the entire document 100, for example), and only rendering one predetermined page 108 of the segment 104 at one time (as opposed to rendering all the pages 106*a*, 106*b*, . . . , 106*n* of the segment 104, for example), processing time is reduced.

Figure 1B:
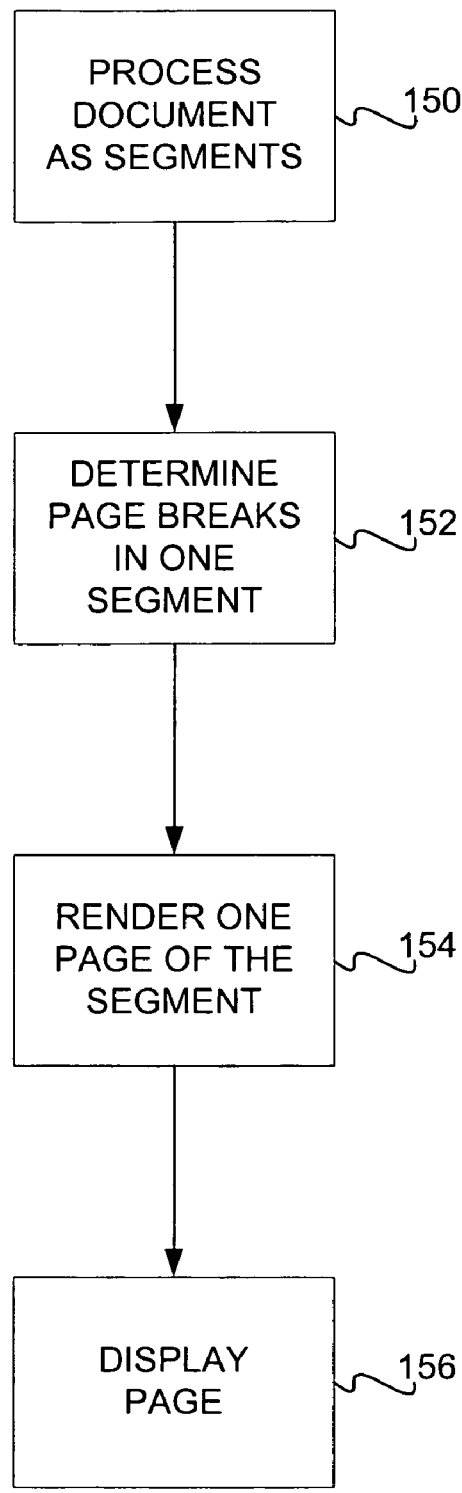
FIG. 1(b) is a flowchart according to one embodiment of the invention.

A method corresponding to the above overview of embodiments of the invention is now described. Referring to FIG. 1(*b*), a flowchart of such a method, according to one embodiment of the invention, is shown. In 150, an electronic document, which is made up of at least text, is processed as a number of segments. In one embodiment, this can mean assembling the document from a number of already existing segments, each of which may, for example, correspond to one or more physical files of data. In another embodiment, this can mean dividing an already existing document into a number of segments, where the existing document itself already exists as one physical file of data. The invention is not limited to either approach or any combination thereof, however.

In 152, a number of page breaks within a predetermined segment of the document is determined. Desirably, this does not involve rendering each individual page of the segment, but rather only determining the page breaks within the segment. In one embodiment, 152 can involve first entering the predetermined segment of the document into memory, such as volatile memory, as has been described, such that the page breaks within the predetermined segment are also stored in the memory. In 154, a predetermined page within the predetermined segment is rendered, then displayed in 156, for example, on a display device.

It is noted that this and other methods described in the detailed description are desirably computer-implemented methods. Such computer-implemented methods are desirably realized at least in part as one or more programs running on a computer—that is, as a program made up of instructions and executed from a computer-readable medium such as a memory by a processor of a computer. The programs are desirably storable on a machine-readable medium such as a floppy disk or a CD-ROM, for distribution and installation and execution on another computer.

Specific Embodiment for Dynamic Pagination

In this section of the detailed description, a specific embodiment of the invention for performing the dynamic pagination as described in the preceding section of the detailed description is presented. It is noted that the invention is not limited to this specific embodiment, however. As described herein, the specific embodiment pertains to electronic documents that are electronic books. However, embodiments of the invention are not so limited to documents that are books, as can be appreciated by those of ordinary skill within the art.

Referring first to FIG. 2(*a*), a diagram of how a page of an electronic book is dynamically paginated according to an embodiment of the invention is shown. The page 200 includes a number of slots, such as the slot 202, into which text is "poured" (that is, inserted) to determine how much text will fit onto the page 200. The text is inserted within each slot from a left-to-right (or right-to-left as, for example, with Hebrew) manner in one embodiment, as indicated by the arrow 204. The slots are filled column by column, top to bottom; thus, in the two-column set-up of FIG. 2(*a*), first the left hand column is filled from top to bottom, as indicated by the arrow 206, and then the right hand column is filled from top to bottom, as indicated by the arrow 208.

Thus, to determine how much text fits onto a given page, an embodiment of the invention determines how much text fits into each slot of the page, and proceeds from slot to slot and column to column as described. To determine how much text fits into each slot, the determination may be performed as to complete words (viz., how many complete words fit into the slot, where "word" can denote a symbol e.g. in non-western-languages), or may be performed utilizing hyphenation (viz., hyphenating a last word to make a portion of the word fit into the slot). The invention is not so limited.

Embodiments of the invention provide for dynamic pagination in that the structure of a given page, such as the page 200 of FIG. 2(*a*) is specific to a given device. For example, a dedicated electronic book device may have two columns of slots, with a predetermined number of slots in each column, each of a predetermined width, while a palm-PC device may have only one column of slots, with a lesser number of slots, while a desktop computer with a large display monitor may have three or more columns of slots, with a larger numbers of slots in each column that are of greater width. In this way, embodiments of the invention provide for adapting an electronic book to whatever display device is available. The number of columns on a page, the number of slots on a page, the width and height of the slots, etc., are all predetermined as to a specific display device (or specified by the author of the book, or adjusted by the user), while the mechanism provided by an embodiment of the invention to dynamically paginate an electronic book as to a given page for a given display device remains the same.

In one embodiment of the invention, the width and height of a slot is fixed and measured by a number of pixels. The font size of the font utilized in rendering the text in each slot is also fixed. The invention is not necessarily so limited, however.

It is noted that dynamic pagination as to a page such as the page of FIG. 2(*a*) refers in at least some embodiments of the invention to determining only the page breaks within the text of an electronic book a priori, and not to, for example, actually laying out each page within the text a priori. That is, when an electronic book is first input, dynamic pagination just determines where each page break is—for example, within an internal representation of the electronic book— and does not determine how each page will be actually displayed. This is advantageous, because page layout generally takes longer than just determining page breaks, so that only accomplishing the latter means that the electronic book will be more quickly ready to be viewed by a user once it has been input.

This is shown more specifically in reference to FIG. 2(*b*). The bar 210 represents a segment of an electronic book text. Dynamic pagination according to an embodiment of the invention is accomplished to determine the page breaks within the electronic book text for a given defined page of a display device. Thus, dynamic pagination may determine—that is, denote—that page breaks as represented by perpendicular lines 212, 214 and 216 are required in order for a given defined page of a display device. It is noted that the diagram of FIG. 2(*b*) is only meant for illustrative purposes, and does not convey a limitation of embodiments of the invention as to how electronic book text is structured from a data structure standpoint.

Figure 2A:
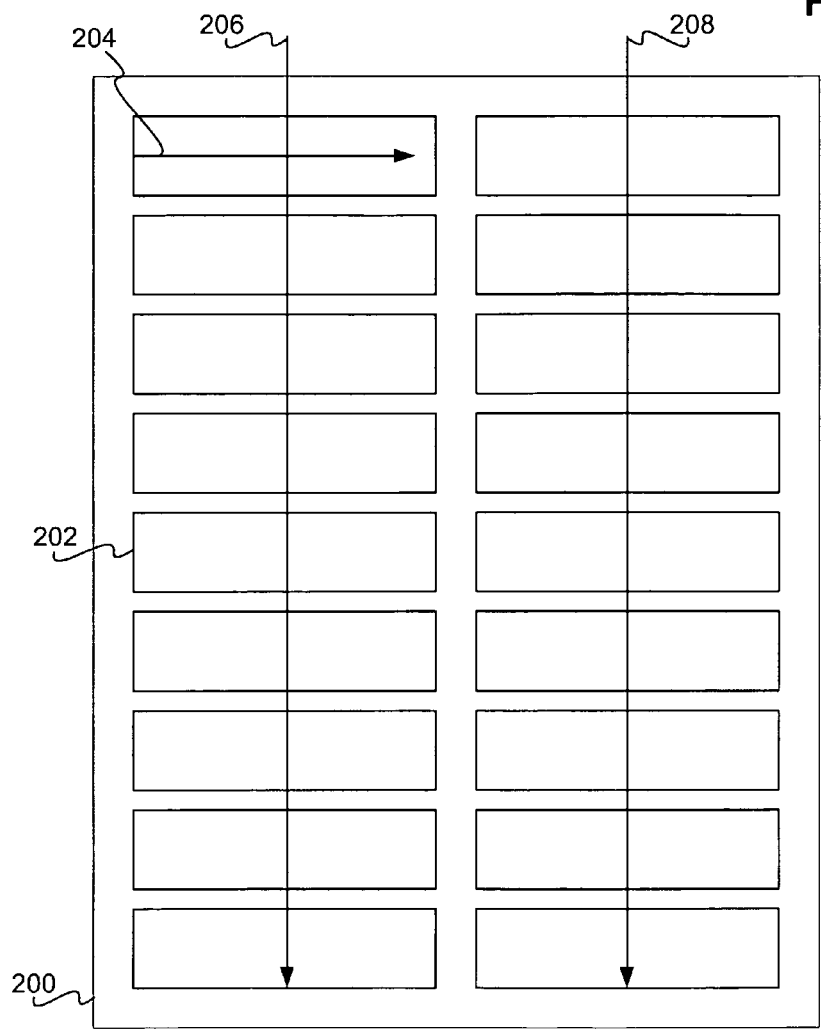
FIG. 2(a) is a diagram showing the manner by which a page of an electronic book is dynamically paginated according to an embodiment of the invention.
Figure 2B:
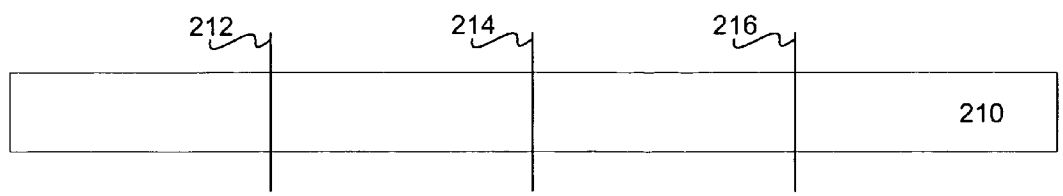
FIG. 2(b) is a diagram showing in a graphically conceptual manner an electronic book text that has been dynamically paginated, according to an embodiment of the invention.

Two special cases also deserve description in this overview section of the detailed description. While the diagram of FIG. 2(*a*) illustrates the manner by which standard text is poured into slots of a page to yield dynamic pagination, electronic books may also include footnotes and images. With respect to footnotes, the user may have the option of viewing the footnotes as true footnotes (shown at the bottom of the page), or as endnotes, where they are displayed all at once at the end of a document, or in "hyper space", i.e outside the text flow, e.g. as a separate page (for each footnote) that is brought into view upon the user's demand (e.g. by activating a hypertext link). In the latter case, the endnotes are saved, and can be displayed as normal text at the end of the document, and dynamically paginated as has been described in conjunction with FIG. 2(a). In the former case, however, the description of dynamic pagination as has been described in conjunction with FIG. 2(a) is modified somewhat.

Figure 2C:
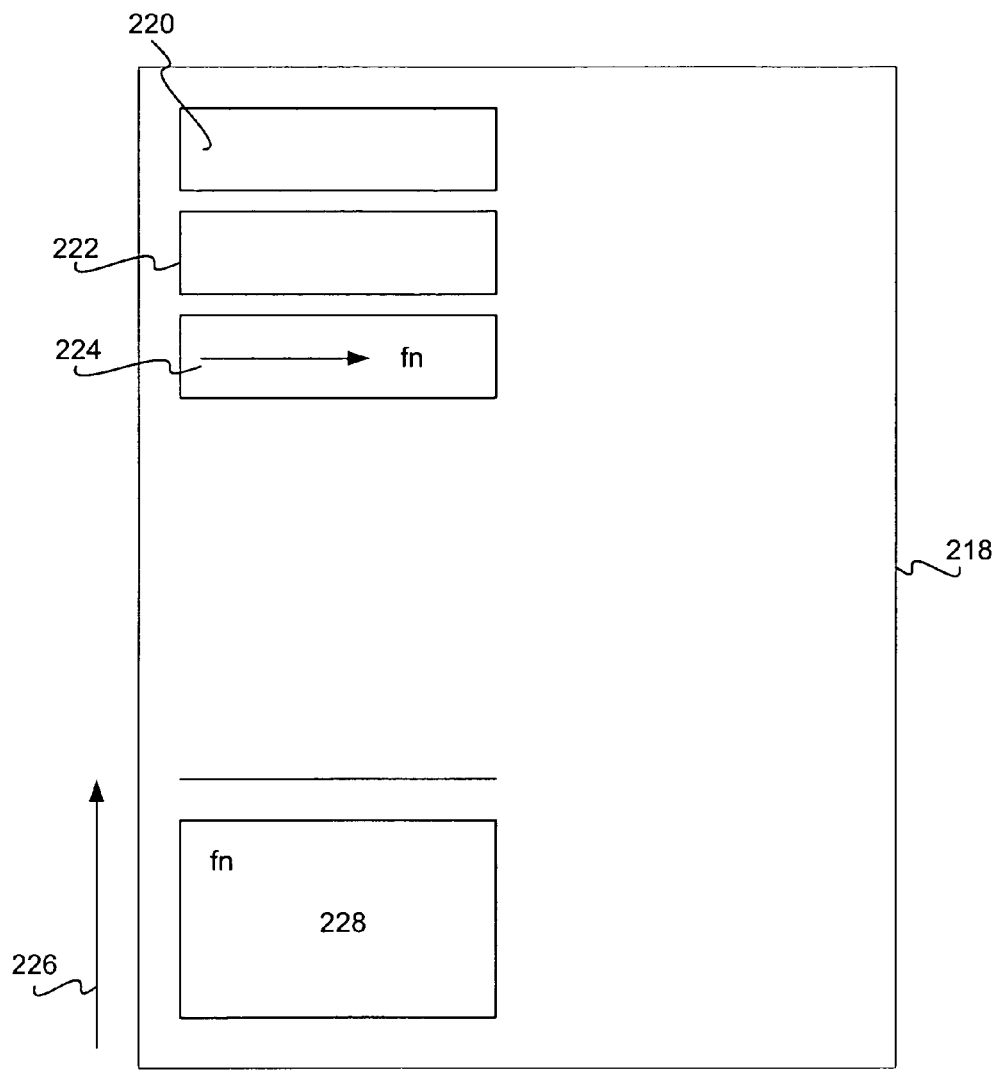
FIG. 2(c) is a diagram showing the manner by which a page of an electronic book is dynamically paginated, in the special case of a footnote present on the page, according to an embodiment of the invention.

This is shown by reference to FIG. 2(c). Within the page 218, text is poured in successive slots 220, 222, and 224, until a footnote is reached in the text as shown in the slot 224. In this case, the dynamic pagination stops and attempts to fit the footnote in the current column. It does this by decreasing the size of the current column, as represented by the arrow 226, to create room for the footnote text within the column, as represented by the box 228. For example, the box 228 may take up the space previously allocated for one or more slots, such that the column is decreased by as many (empty) slots as needed to accommodate the footnote.

There are two variations in accommodating footnotes not shown by reference to FIG. 2(c). First, the footnote within the text may be reached when the dynamic pagination process is already near the end of a first (or current) column of the page, such that one or more of the number of slots that need to be allocated for the footnote in the current column have already been used to pour text into. In such an instance, the dynamic pagination process does not reduce the size of the current column. Rather, the process tags the footnote as postponed, such that in a next column on the same page, room is made for the footnote within the column before any text is poured into slots of the column. As a second variation, if the footnote cannot be accommodated on the page where it is first referenced, then it is tagged as postponed, such that in the first column of the next page, room is made for the footnote within the first column of the next page before any text is poured into the slots of the first column. (in one embodiment, a footnote covers at the most a certain predefined fraction of the column's height, e.g. ¾ of the column).

Figure 2D:
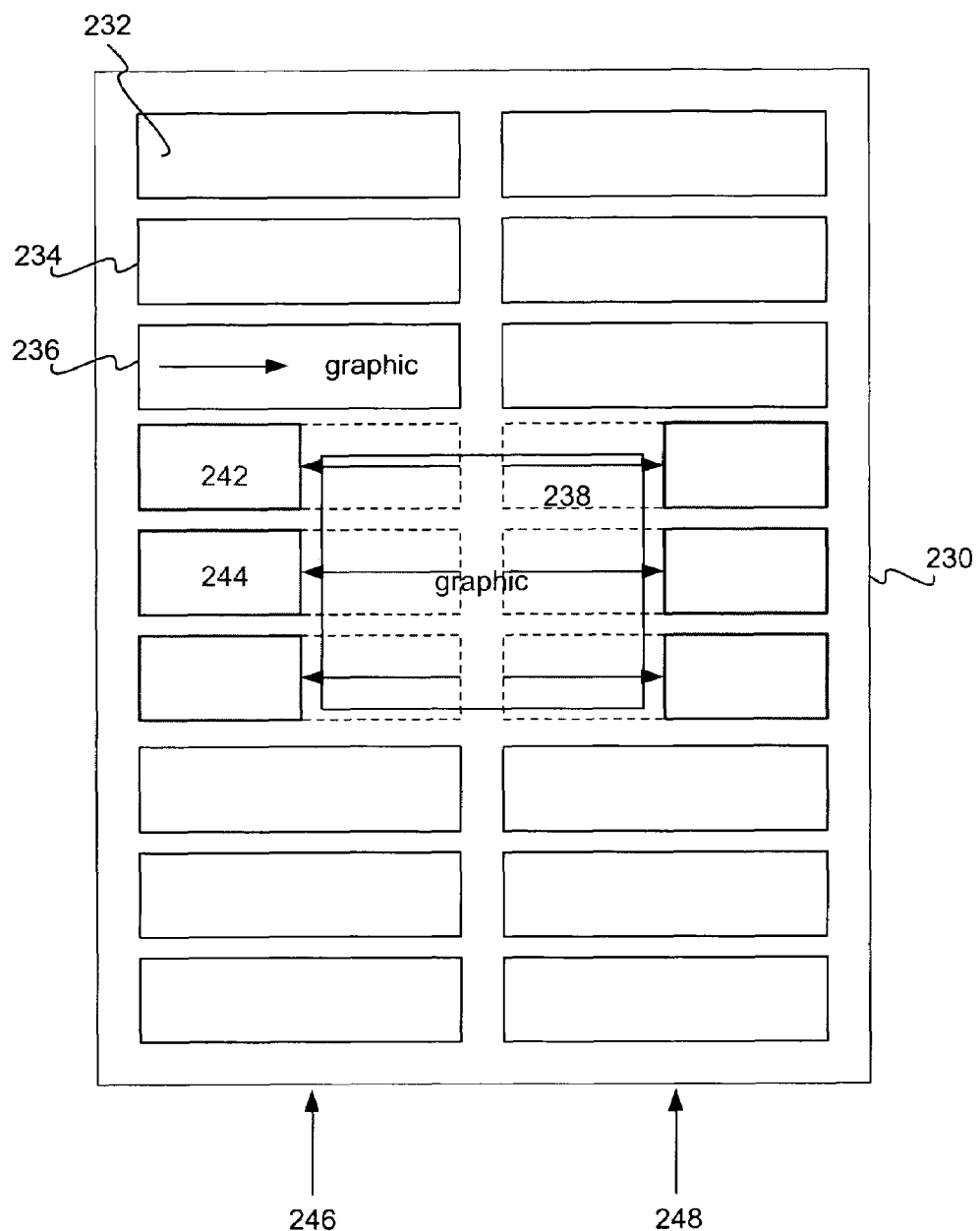
FIG. 2(d) is a diagram showing the manner by which a page of an electronic book is dynamically paginated, in the special case of an image present on the page, according to an embodiment of the invention.

The special case of images is shown with reference to FIG. 2(d). Text is poured into slots of the page 230, such as the slots 232, 234 and 236, until a graphic reference (e.g., a file name of a graphic) is encountered within the text file, as shown in the slot 236. As in the case of footnotes, it is determined if the graphic can fit on the page given the text already poured into slots of the page; if so, then the graphic is so fit, otherwise it is postponed to a next column of the current page or a next page. A graphic can also include positioning information as to where on the page it should desirably be displayed: in-line with the text, left justified in the current column, right justified in the current column, center justified in the current column, inserted at the top of a page, vertically centered in a page, inserted at the bottom of a page, left justified in a page, right justified in a page, and/or horizontally centered in a page, the invention is not so limited, however.

In the case of FIG. 2(d), the graphic 238 is to be positioned horizontally and vertically centered on the page 230. Thus, room is made for the graphic 238 by decreasing the width of the slots on either side of the graphic, as is shown in FIG. 2(d). Once room is made for the graphic 238, then the pouring of text into slots of the page 230 continues. Thus, after the slot 236 is filled, text is poured in slots 242 and 244, et seq.

As has been noted, if room cannot be made for a graphic, then it is postponed in a manner similar to the way footnotes are postponed, either to a next column of the current page, or to a next page altogether. For example, as shown in FIG. 2(d), room can be made for the graphic 238 because it was encountered in the text while the first column of slots (as pointed to by the arrow 246) was still being filled. However, if the graphic was encountered in the text after the first column of slots was filled, and while the second column of slots (as pointed to by the arrow 248) was being filled, then the graphic would have to be postponed to the next page—the graphic 238 as shown in FIG. 2(d) spans horizontally both columns of the page 230, and thus it could not be accommodated on the current page, because empty slots could not be moved or adjusted for the graphic.

In other words, accommodation for footnotes and images is made on a given page only when such accommodation does not involve changing any slot into which text has already been poured. In the case just described in the previous paragraph, this means that placement of the graphic has to be postponed to a next page, because the only way the graphic can be accommodated on the current page is to change the number of slots in the first column—but these slots have already had text poured thereinto, so they cannot be adjusted. This general rule is applicable in at least some embodiments of the invention—that accommodation of footnotes and images is allowed only when empty slots need adjustment or modification, and not slots into which text has already been poured—and provides for quicker dynamic pagination, in that such pagination is a one-pass process, and not a multi-pass process.

A computer-implemented method for dynamic pagination, consistent with the preceding description within this section of the detailed description follows. What is meant by a paginatable segment of electronic book text (where the text may include footnotes, and refer to graphics) is first described by reference to FIG. 3(a). A paginatable segment of text is a part of an electronic book, such that the electronic book may be comprised of one or more such segments of text. When a given segment of text is input, dynamic pagination is performed as to the segment. Thus, any page may within the segment may subsequently be quickly referenced, in that the page breaks within the segment have been determined, or denoted. When a new segment is referenced, then it, too, is initially dynamically paginated. Thus, breaking up an electronic book into a plurality of paginatable segments provides for quicker dynamic pagination, in that the entire electronic book does not have to be paginated dynamically a priori, but only the current segment of interest.

Figure 3A:
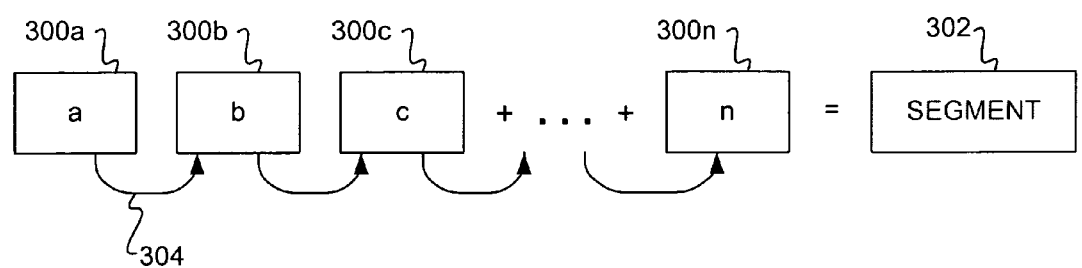
FIG. 3(a) is a diagram of a paginatable segment of text (including footnotes and reference to graphics), according to an embodiment of the invention.

However, a segment does not necessarily refer to a specific file. Rather, a segment can refer to a series of files, as is shown in FIG. 3(a). In FIG. 3(a), each of files 300a, 300b, 300c, . . . , 300n is linked as a series of files defining the segment 302. They are linked as shown in FIG. 3(a) by arrows such as the arrow 304 linking file 300a to file 300b. Anchors within a file links the file to a next file. In one embodiment, the files are in HyperText Markup Language (HTML) format, known within the art, such that a specially defined segment tag within successive HTML files defines a new segment. It is noted that the invention is not necessarily limited to a segment referring to a number of different files, and that other embodiments of the invention can be utilized such that a segment refers to a single file. In one embodiment, a segment contains exactly one file.

Figure 3B:
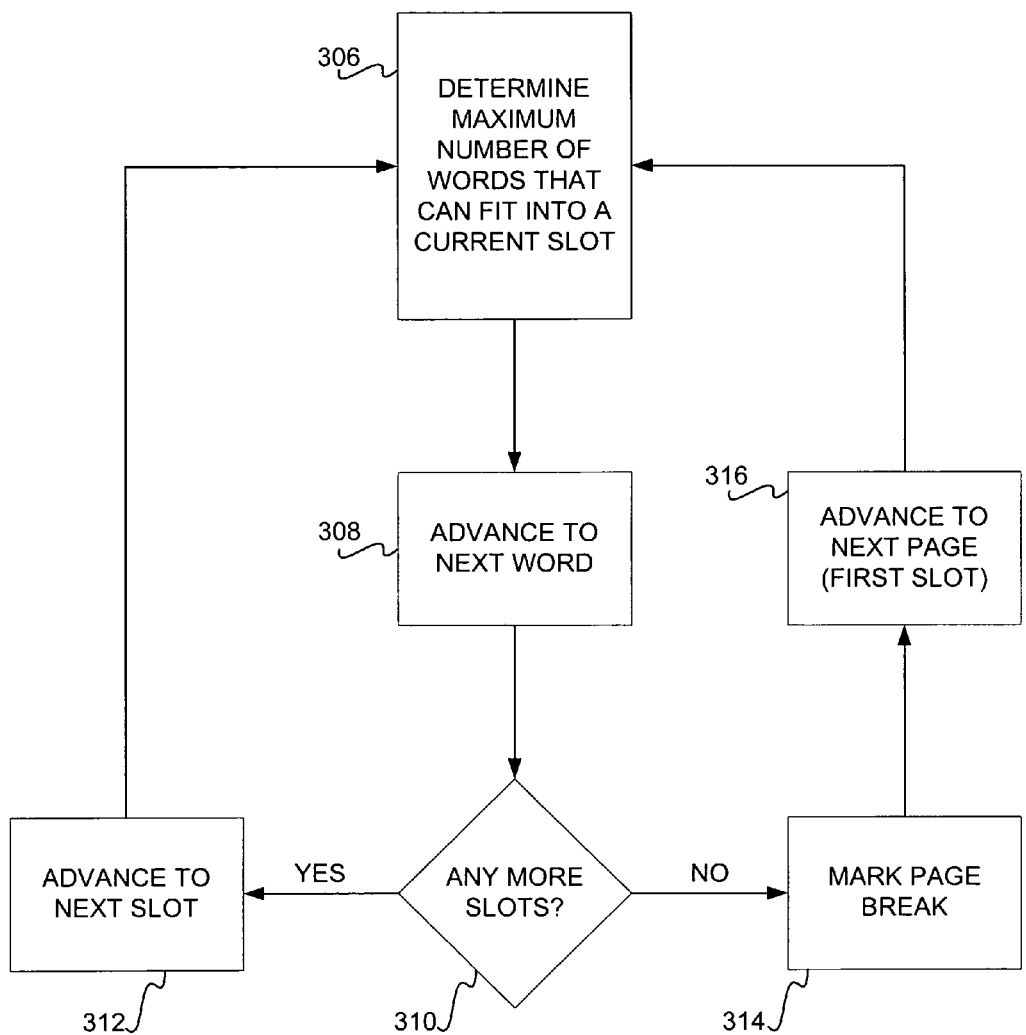
FIG. 3(b) is a flowchart of a method for dynamically paginating text, according to an embodiment of the invention.
Figure 3C:
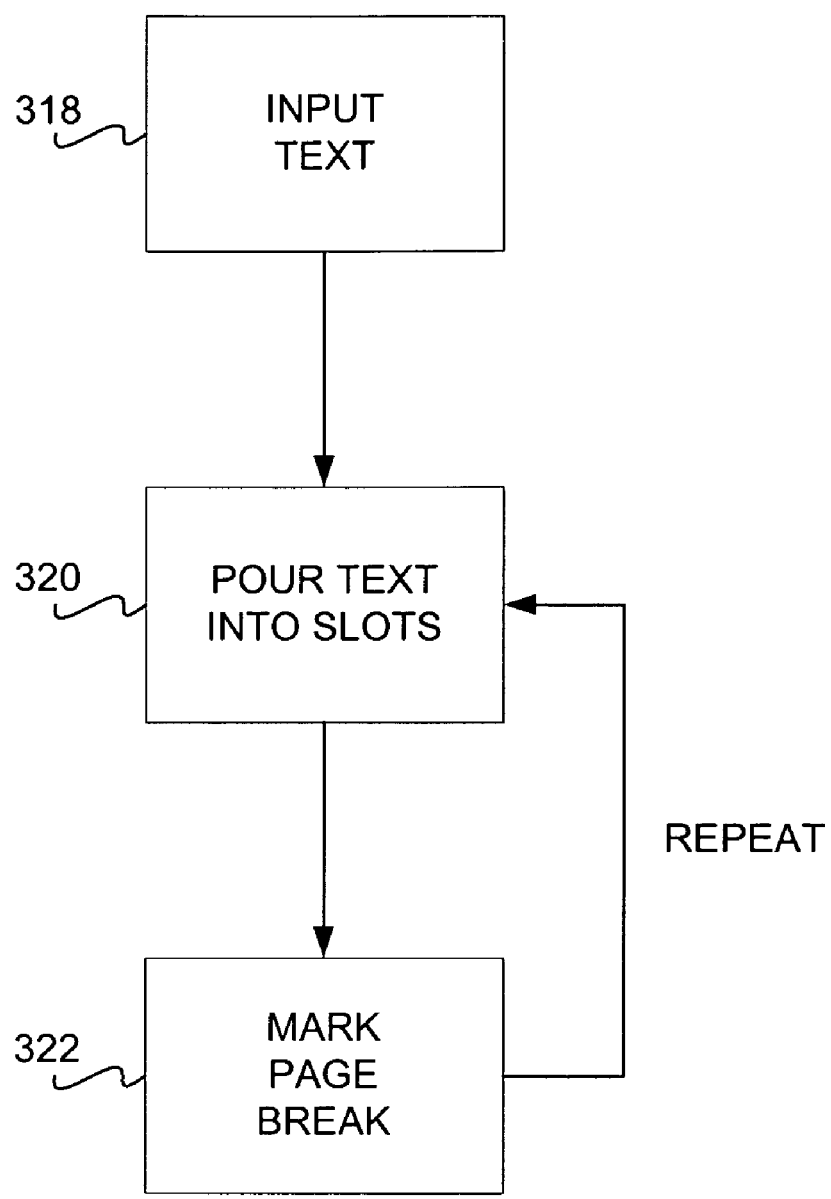
FIG. 3(c) is a flowchart of another method for dynamically paginating text, according to an embodiment of the invention.
Figure 3D:
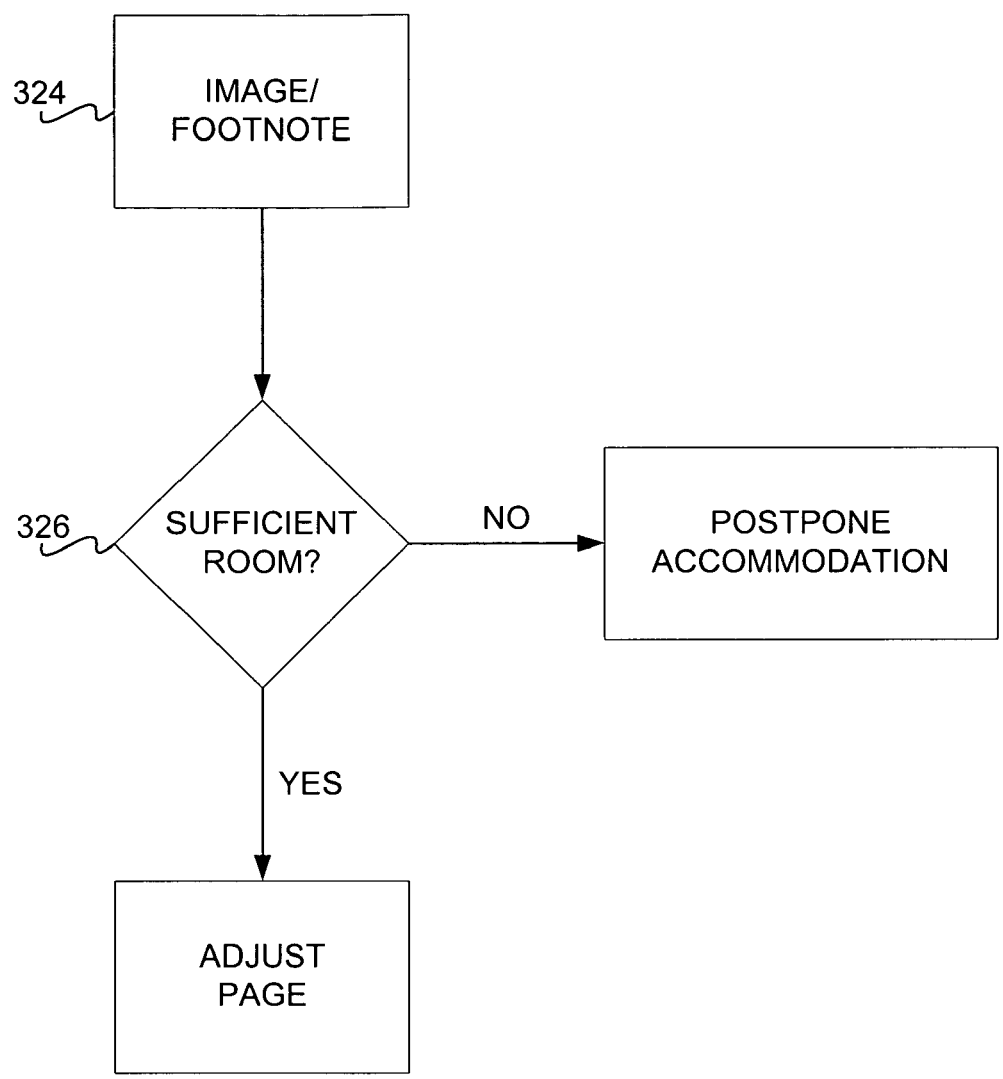
FIG. 3(d) is a flowchart of a method for dynamically paginating text in the special case of encountering an image or a footnote, according to an embodiment of the invention; and, FIG. 4 is a diagram of a representative electronic device, according to an embodiment of the invention.

Referring next to FIG. 3(b), a flowchart of a method for dynamically paginating a paginatable segment of text is shown. The method assumes a current position in the text defined by the paginatable segment—for example, starting with a first word within the text. The method also assumes that each of a number of pages (that is, a number of pages as will be necessary to hold the segment of text) has a predetermined number of slots, as described in the previous section of the detailed description, such that there is a current page—for example, starting with a first page.

Thus, in 306, the method, starting at a current position in the text defined by the paginatable segment, determines a maximum number of words that fit into a current slot of a series of predetermined slots of the current page, organized into one or more columns on the page. Once the maximum number of words that fit into the current slot of the current page has been determined, in 308, the current position in the text is advanced to the next word after the last word that has been determined to fit into the current slot of the current page. It is noted that if there is no more text left in the paginatable segment, then the method ends at 308.

Otherwise, in 310, it is determined whether there are any more slots within the current page. If there are, then in 312, the current slot is advanced to the next slot, in a predetermined manner—for example, from top to bottom within a column, where the columns of slots are proceeded to from left to right, as has been described. Then the method continues in 306 again, determining the maximum number of words that fit into the new current slot, etc.

If there are no more slots left in the current page, then the method instead proceeds from 310 to 314, where a page break is marked. In one embodiment, the page break is marked, or denoted, in an internal representation of the plurality of text defined by the paginatable segment. For example, the internal representation may include reference to each file within the paginatable segment, such that a page break is marked by indicating the paginatable segment, the file within the paginatable segment, and the position within that file. The invention is not so limited, however. In 316, the current page is advanced to a next page (the first slot thereof), and then the method continues in 306 again, as has been explained.

The specific embodiment of the invention of FIG. 3(*b*) can be generalized as shown in the method of FIG. 3(*c*). Referring now to FIG. 3(*c*), in 318, a plurality of text is input—for example, a series of files including the text that defines a paginatable segment. In 320, the text is poured into a series of slots of a page, which can be organized into one or more columns on the page, until all the slots of the page have been processed (that is, until all the slots have had text poured thereinto). In 322, a page break is marked in an internal representation of the plurality of text, and this process of 320 and 322 is repeated until all the text has been poured into slots (and thus the method is finished).

As described in the previous section of the detailed description, special cases are made for dynamic pagination when graphics or footnotes are encountered (the latter, in the case where the footnotes are desired to be displayed as footnotes on a page, as opposed to endnotes at the end of the text). These special cases are now described in conjunction with specific embodiments of the invention. In these specific embodiments, the plurality of text is defined as a series of lines, such that each line within the plurality of text includes text to be poured, or a footnote, or reference to a graphic. However, as used herein, the term line does not necessarily have to relate to a specific line within the text. Rather, the term line can also relate to a specific position within the text, for example, if the text is so organized. For example, in one embodiment, each line corresponds to a slot, as has been described previously in the detailed description. The invention is not so limited.

In 324, it is determined that a current line (where the term line can also refer to a current position or other manner by which a give place within the text is indicated) refers to an image or a footnote. In 326, it is determined whether the image or the footnote has sufficient room on the page to fit—given the already filled slots on the page, as has been described in the previous section of the detailed description (i.e., such that the dynamic pagination process is a one-pass—and not a two-pass—process). With respect to images specifically, the scale of the image may be resized as necessary if so desired.

If there is sufficient room on the page, then in 328, the page is adjusted as necessary. For example, subsequent slots on the page may be decreased in size, or the number of slots on the page may be decreased in number, as has been described in the overview of embodiments of the invention previously in the detailed description. Otherwise, in 330, accommodation of the footnote or graphic on the page is postponed to the next page (or, to a next column of the current page, in one embodiment of the invention), such that as soon as that next page is being processed, accommodation of the footnote or graphic is made before any text is poured into the slots of the page.

Representative Device for Viewing Electronic Documents

As described, the methods of the previous sections of the detailed description can be implemented on any type of computerized device, such as a general-purpose laptop or desktop computer, a personal digital assistant (PDA), a palm-top computer, a hand-held computer, a specialized electronic book device, etc. However, one such representative device is described in this section of the detailed description. Those of ordinary skill within the art can appreciate that the invention is not limited to this representative device for viewing electronic documents.

Figure 4:
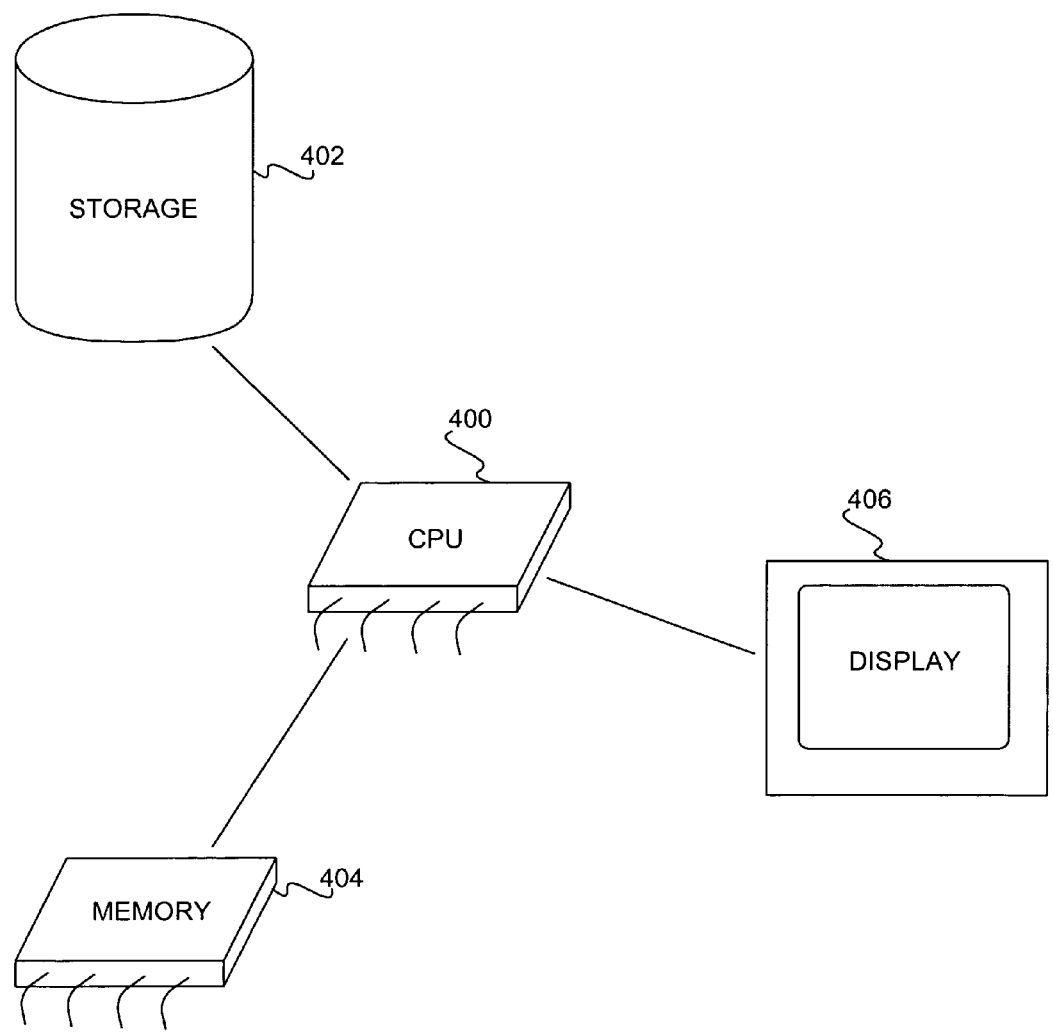

Referring to FIG. 4, a diagram of such a representative device, in accordance with an embodiment of the invention, is shown. The electronic device includes a processor, or central-processing unit (CPU), 400, a storage device 402, a memory device 404, and a display device 406. The processor 400 is the processor that executes computer programs to perform methods such as those described in the preceding sections of the detailed description. The storage device 402 is a non-volatile storage device, such as a hard disk drive, flash memory device, PC card hard drive, etc., on which an electronic document having a number of segments is stored. The memory device 404 is a volatile device, such as a dynamic random-access memory (DRAM), a synchronous dynamic-random access memory (SDRAM), etc., into which one of the segments is stored temporarily, into which the denoted page breaks of the segment are stored temporarily, and into which one page of the segment is stored as rendered prior to display. The display device 406 can be a flat-panel display, such as a liquid-crystal display (LCD), a plasma display, etc., or a cathode-ray tube (CRT), such as commonly found with desktop computers as monitors. The device 406 displays a rendered, or laid-out, page.

Thus, the processor 400 executes a computer program to determine a number of page breaks within the one segment of the document stored in the memory device 404, after entering the segment into the device 404 from the storage device 402. The page breaks are also stored in the memory device 404 in one embodiment. The processor 400 also executes a second computer program to render one of the pages of the segment stored in the memory device 404, and display that page on the display device 406. Each of these programs may be separate, or part of a larger computer program, in which latter case the individual programs are typically referred to as software objects, or software components, as known in the art.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, in some embodiments of the invention, the embodiments described herein can be utilized in conjunction with the subject matter described in the related applications, which have been described at the beginning of this application, and which have been incorporated by reference. The invention is not so limited, however. Therefore, it is manifestly intended that this invention be limited only by the following claims and equivalents thereof.

What is claimed is:

1. A computer-implemented method for dynamically paginating comprising:
   processing a document of at least text as a plurality of segments;
   determining a plurality of page breaks within a predetermined segment and pouring text of the predetermined segment into a series of predetermined slots of a first page organized into at least one column of the first page until the slots have been processed, the text comprising a plurality of lines, the pouring including:
   determining whether a current line refers to an image;
   determining whether the image has sufficient room on the page to fit given previously filled slots on the page and rescaling of the image; and
   accommodating the image on the page by decreasing in size subsequent slots;
   rendering a predetermined page within the predetermined segment; and,
   displaying the predetermined page.

2. The method of claim 1, processing a document of at least text as a plurality of segments comprises assembling the document into the plurality of segments.

3. The method of claim 1, processing a document of at least text as a plurality of segments comprises dividing the document into the plurality of segments.

4. The method of claim 1, determining a plurality of page breaks within a predetermined segment further comprises:
   denoting a page break; and,
   repeating pouring the text into successive pages and denoting a page break until the text is depleted.

5. The method of claim 1, pouring the text into a series of predetermined slots comprises:
   from a current position in the text, determining a maximum number of words that fit into a current slot;
   advancing the current position in the text to a next word after the maximum number of words that fit into the current slot; and,
   advancing the current slot to a next slot and repeating until the slots of the page have been processed.

6. A computer-implemented method for dynamically paginating a document having a plurality of segments comprising:
   entering a predetermined segment of the document into memory, the predetermined segment comprises a plurality of text lines;
   determining each of a plurality of page breaks within the predetermined segment of the document;
   pouring the text lines into a series of predetermined slots of a page organized into at least one column of the page until the slots have been processed, the pouring comprising:
   ascertaining whether a current line references an image;
   determining the image in relation to slots previously filled and a rescaling factor associated with the image;
   rendering the image if there is sufficient room on the page for the image to fit; and
   decreasing in size subsequent slots on the page as necessary; and,
   storing the plurality of page breaks within the predetermined segment of the document in the memory.

7. The method of claim 6, further comprising
   denoting a page break; and,
   repeating pouring the text into a next page until finished.

8. The method of claim 6, pouring the text into a series of predetermined slots comprises:
   from a current position in the text, determining a maximum number of words that fit into a current slot,
   advancing the current position in the text to a next word after the maximum number of words that fit into the current slot; and,
   advancing the current slot to a next slot and repeating until the slots of the page have been processed.

9. The method of claim 6, further comprising displaying a desired page.

10. The method of claim 9, displaying a desired page comprises:
    determining a page break corresponding to the desired page; and,
    laying out the page, including determining how text is to be displayed in each slot of the page.

11. The method of claim 9, displaying a desired page comprises rendering the desired page for display on a display device.

12. A computer-implemented method for dynamically paginating a segment of a document of at least text comprising, for each of at least one page of the segment:
    pouring text of the segment into a series of predetermined slots of a page organized into at least one column of the page, until the slots of the page have been processed the text comprises a series of lines, the pouring includes:
    determining whether a current line refers to an image;
    upon determining that the current line refers to an image, determining whether the image has sufficient room on the page to fit given already filled slots on the page and resizing scale of the image as necessary; and
    upon determining that the image has sufficient room on the page to fit, accommodating the image on the page, decreasing in size subsequent slots on the page as required; and,
    denoting a page break.

13. The method of claim 12, pouring the text into a series of predetermined slots comprises:
    from a current position in the text determining a maximum number of words that fit into a current slot;
    advancing the current position in the text to a next word after the maximum number of words that fit into the current slot; and,
    advancing the current slot to a next slot and repeating until the slots of the page have been processed.

14. The method of claim 12, the series of predetermined slots of the page each has a predefined height and a predefined width.

15. The method of claim 12, upon determining that the image has insufficient room on the page to fit, postponing accommodation of the image to the next page.

16. The method of claim 12, the image has a predetermined position of at least one of: in-line, left justified in current column, right justified in current column, center justified in current column, top of page, vertically center of page, bottom of page, left justified in page, right justified in page, horizontally center of page.

17. The method of claim 12, the text is defined as a series of lines and wherein pouring the text comprises:
   determining whether a current line refers to a footnote;
   upon determining that the current line refers to a footnote, determining whether the footnote has sufficient room on the page to fit, given already filled slots on the page; and,
   upon determining that the footnote has sufficient room on the page to fit, accommodating the footnote at a bottom of a column on the page, decreasing in number slots of the column as required.

18. The method of claim 17, upon determining that the footnote has insufficient room on the page to fit, postponing accommodation of the footnote to a next page.

19. A machine readable medium having instructions stored thereon for execution by a processor to perform a method comprising:
   processing a document of at least text as a plurality of segments the text forms a sequence of lines;
   determining a plurality of page breaks within a predetermined segment;
   pouring text of the predetermined segment into a series of predetermined slots of a first page organized into at least one column of the first page until the slots have been processed, the pouring comprising:
      determining whether a current line sequence references an image;
      ascertaining based at least in part on currently filled slots on the page and a resizing factor whether sufficient room exists on the page to render the image; and
      accommodating the image on the page by dynamically reducing subsequent slots on the page;
   rendering a predetermined page within the predetermined segment; and,
   displaying the predetermined page.

20. The method of claim 19, determining a plurality of page breaks within a predetermined segment further comprises:
   denoting a page break; and,
   repeating pouring the text into successive pages and denoting a page break until the text is depleted.

21. The method of claim 19, pouring the text into a series of predetermined slots further comprises:
   from a current position in the text determining a maximum number of words that fit into a current slot;
   advancing the current position in the text to a next word after the maximum number of words that fit into the current slot; and
   advancing the current slot to a next slot and repeating until the slots of the page have been processed.

22. A machine readable medium having instructions stored thereon for execution by a processor to perform a method comprising:
   entering a predetermined segment of the document into memory;
   determining each of a plurality of page breaks within the predetermined segment of the document comprising:
      pouring text of the predetermined segment into a series of predetermined slots of a page organized into at least one column of the page, until the slots have been processed, the text defined as line sequences, the text forming one or more lines;
      identify whether a current line sequence refers to an image;
      based at least in part on previously filled slots and an image resealing factor, determining whether ample room exists on the page to insert the image;
      reducing content capacity of subsequent slots; and
      inserting the image on the page; and,
   storing the plurality of page breaks within the predetermined segment of the document in the memory.

23. The method of claim 22, determining each of a plurality of page breaks within the predetermined segment of the document further comprises:
   denoting a page break; and,
   repeating pouring the text into a next page until finished.

24. The method of claim 22, pouring the text into a series of predetermined slots comprises:
   from a current position in the text, determining a maximum number of words that fit into a current slot;
   advancing the current position in the text to a next word after the maximum number of words that fit into the current slot; and,
   advancing the current slot to a next slot and repeating until the slots of the page have been processed.

25. A machine readable medium having instructions stored thereon for execution by a processor to perform a method comprising:
   pouring text of a segment into a series of predetermined slots of a page organized into at least one column of the page until the slots of the page have been process, the text defined as a series of lines, the pouring including:
      determining whether a current line refers to an image;
      upon determining that the current line refers to an image, determining whether the image has sufficient room on the page to fit, given already filled slots on the page and resizing scale of the image;
      upon determining that the image has sufficient room on the page to fit, and accommodating the image on the page, decreasing in size subsequent slots on the page; and,
   denoting a page break.

26. The method of claim 25, pouring the text into a series of predetermined slots comprises:
   from a current position in the text, determining a maximum number of words that fit into a current slot;
   advancing the current position in the text to a next word after the maximum number of words that fit into the current slot; and,
   advancing the current slot to a next slot and repeating until the slots of the page have been processed.

27. The method of claim 25, the text is defined as a series of lines and wherein pouring the text comprises:
   determining whether a current line refers to a footnote;
   upon determining that the current line refers to a footnote, determining whether the footnote has sufficient room on the page to fit, given already filled slots on the page; and, upon determining that the footnote has sufficient room on the page to fit, accommodating the footnote at a bottom of a column on the page, decreasing in number slots of the column as required.

28. An electronic device comprising:

a storage that stores a document having a plurality of segments;

a memory that stores one of the plurality of segments; and, a processor that executes a program that determines a plurality of page breaks within the one of the plurality of segments stored in the memory, each page break determined by pouring text of one of the plurality of segments into a series of predetermined slots of a page organized into at least one column of the page until the slots have been processed, the program further establishes whether images are reference by the text, if an image is referenced, the program ascertains based on previously filled slots and an image rescaling factor whether sufficient space exists on the page to insert the image, where sufficient space exists to insert the image, the image is inserted and the slot size of subsequent slots is diminished.

29. The device of claim 28, further comprising:

a display device that displays a page of the one of the plurality of segments, wherein the processor further executes a second program that renders the page displayed on the display device.

30. The device of claim 28, the program is utilized to pour the text into a series of predetermined slots by:

from a current position in the text, determining a maximum number of words that fit into a current slot;

advancing the current position in the text to a next word after the maximum number of words that fit into the current slot; and, advancing the current slot to a next slot and repeating until the slots of the page have been processed.

* * * * *

UNITED STATES PATENT AND TRADEMARK OFFICE
CERTIFICATE OF CORRECTION

PATENT NO. : 7,028,258 B1 Page 1 of 1
APPLICATION NO. : 09/410414
DATED : April 11, 2006
INVENTOR(S) : Charles P. Thacker et al.

It is certified that error appears in the above-identified patent and that said Letters Patent is hereby corrected as shown below:

In column 12, line 8, in Claim 6, after "image" insert -- size --.

In column 12, line 23, in Claim 8, after "slot" delete "," and insert -- ; --, therefor.

In column 12, line 45, in Claim 12, after "processed" insert -- , --.

In column 12, line 61, in Claim 13, after "text" insert -- , --.

In column 13, line 31, in Claim 19, after "segments" insert -- , --.

In column 13, line 58, in Claim 21, after "text" insert -- , --.

In column 14, line 10, in Claim 22, delete "identify" and insert -- identifying --, therefor.

In column 14, line 13, in Claim 22, delete "resealing" and insert -- rescaling --, therefor.

In column 14, line 39, in Claim 25, delete "process" and insert -- processed --, therefor.

Signed and Sealed this

Twenty-eighth Day of July, 2009

JOHN DOLL
*Acting Director of the United States Patent and Trademark Office*